No. 668,776. Patented Feb. 26, 1901.
E. RILEY.
PLUMBER'S TRAP.
(Application filed May 31, 1900.)

(No Model.)

Witnesses
Howard D. Orr
J. W. Garner

Edward Riley, Inventor
by C. A. Snow & Co.
Attorneys

THE NORRIS PETERS CO., PHOTO-LITHO., WASHINGTON, D. C.

UNITED STATES PATENT OFFICE.

EDWARD RILEY, OF SPOKANE, WASHINGTON.

PLUMBER'S TRAP.

SPECIFICATION forming part of Letters Patent No. 668,776, dated February 26, 1901.

Application filed May 31, 1900. Serial No. 18,636. (No model.)

*To all whom it may concern:*

Be it known that I, EDWARD RILEY, a citizen of the United States, residing at Spokane, in the county of Spokane and State of Washington, have invented a new and useful Plumber's Trap, of which the following is a specification.

My invention is an improved plumber's trap especially designed for use in waste-water pipes leading from washstands, bath-tubs, kitchen-sinks, and the like.

One object of my invention is to provide an improved trap which is efficient in preventing the passage of sewer-gas therethrough by the formation of a double water seal therein.

Another object of my invention is to provide means to prevent the trap being emptied and the water seals therein broken by siphonic action.
A further object of my invention is to provide improved means for efficiently maintaining the water seals when the waste-pipe to which the trap is attached is for a time disused.
A further object of my invention is to provide an improved trap in which the clean-out plug is screwed in place and when removed discharges the contents of both the sealed passages or channels of the trap and permits access to be obtained thereto.

Figure 1:
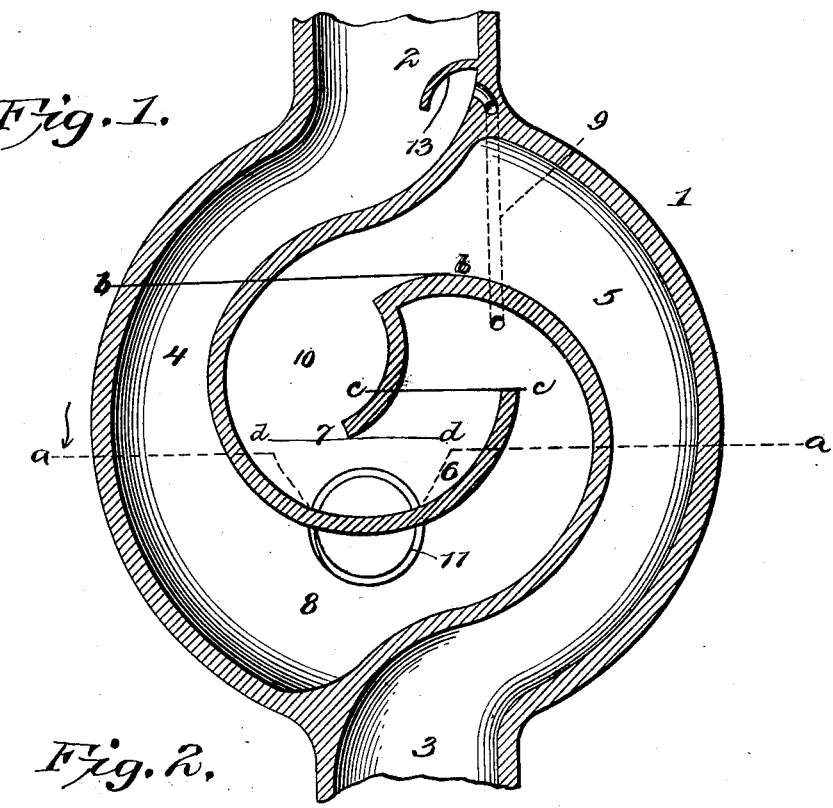
Figure 2:
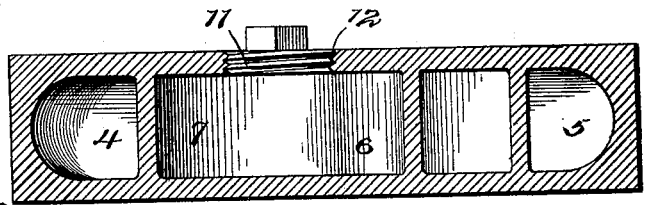
Figure 3:
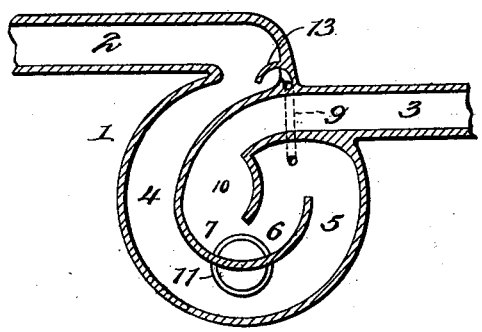
Figure 4:
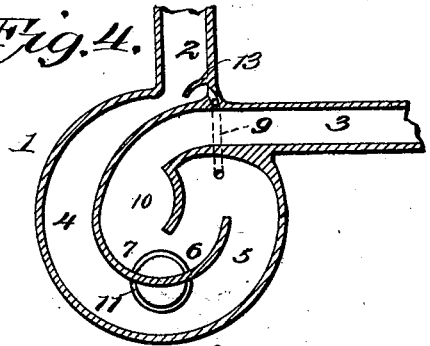

To effect these and other ends, my invention consists in the peculiar construction and arrangement of parts hereinafter fully set forth, and pointed out in the claims.
In the accompanying drawings, Figure 1 is a vertical sectional view of a trap constructed in accordance with my invention. Fig. 2 is a horizontal sectional view of the same taken on the line $a\,a$ of Fig. 1. Figs. 3 and 4 are vertical sectional views of modified forms of my invention.

The trap 1 has the inlet 2 and outlet 3. A curved passage or channel 4 leads from and communicates with the inlet and a curved channel or passage 5 communicates with the channel or passage 4 and leads to the outlet 3. The partition-wall 6, which forms the upper side of the inner portion of the channel or passage 4, is substantially in the form of the lower half of a semicircle, and the communicating inner end of the passage or channel 5 extends downwardly to a point below the horizontal plane or level of the inner end of the passage or channel 4, whereby a water seal 7 is formed between the said channels or passages 4 5 above said partition-wall 6, and a second water seal 8 is formed in the channel or passage 4 below the said partition-wall 6. Hence a double seal is formed in the trap, one disposed within the other, and the said seals are efficient in preventing the passage of sewer-gas through the channels or passages of the trap.

It is important to prevent the emptying of the water from the trap and the breaking of the water seals by siphonic action, and to this end I provide a by-pass 9, which extends from the inlet-opening 2 to the inner end of the channel or passage 4, the upper end of which is protected against the entrance of obstructing substances by a shield 13. A chamber 10 is formed above and communicates with the water seal 7.

Normally the water-level in the trap is at the line $b\,b$. In the operation of my invention the sudden discharge of water through the trap causes the level therein to be lowered to the upper end of the curved partition 6 at $c\,c$ and there ceases to affect the water in the lower seal, but continues to reduce the level in the upper seal until the same is broken at the line $d\,d$. As the level is thus lowered from the line $c\,c$ the water passes up into the chamber 10, and as the level reaches the line $a\,a$, breaking the upper seal, air admitted to the interior of the trap through the bypass 9 causes siphonic action in the trap to be discontinued, whereupon the water in the chamber 10 descends and reëstablishes the seal 7.

The clean-out plug 11 is a screw, which is inserted in the trap in a threaded opening 12 in one side thereof. The said plug at its inner end bears against the outer side of the partition-wall 6 between the traps or water seals 7 8. The said clean-out plug fits snugly against the partition 6, so as to effectually cut off communication between the seals 7 8, and when the said clean-out plug is removed from the trap it enables the contents thereof to be discharged from both seals through the opening 12, the latter affording access to the interior of the trap and to the said water seals 7 8, as will be understood.

I do not desire to limit myself to the precise construction and arrangement of parts hereinbefore described, as it is evident that modifications therein other than those shown in the accompanying drawings may be made without departing from the spirit of my invention.

Having thus described my invention, I claim—

1. A trap provided with communicating inlet and outlet passages and having a water seal formed in the lower side of the inlet-passage and a water seal formed between the communicating inlet and outlet passages, said water seals being disposed one within the other substantially as described.

2. A trap provided with communicating inlet and outlet passages and having a water seal formed in the lower side of the inlet-passage and a water seal formed between the communicating inlet and outlet passages, said water seals being disposed one within the other, a chamber being formed between the outlet-passage and the inner seal, substantially as described.

3. A trap provided with communicating inlet and outlet passages and having a water seal formed in the lower side of the inlet-passage and a water seal formed between the communicating inlet and outlet passages, said trap being provided with a clean-out plug in an opening forming a discharge for the said water seals when the said clean-out plug is removed, substantially as described.

4. A trap provided with communicating inlet and outlet passages, having a water seal formed in the lower side of the inlet-passage and a water seal formed between the communicating inlet and outlet passages and disposed within the other seal, said trap being further provided with a by-pass connecting said inlet-passage with the interior of said trap at a point above the inner seal between the communicating inner ends of said inlet and outlet passages, substantially as described.

In testimony that I claim the foregoing as my own I have hereto affixed my signature in the presence of two witnesses.

EDWARD RILEY.

Witnesses:
E. B. HOPKINSON,
W. W. POTTER.